United States Patent
Godot (10) Patent No.: US 10,668,590 B2
(45) Date of Patent: *Jun. 2, 2020

(54) METHOD OF AND AN APPARATUS FOR MANUFACTURING AN OPTICAL LENS INCLUDING COMPENSATING FOR RELATIVE POSITIONING SHIFT BETWEEN FIRST AND SECOND REFERENCE FRAMES

(71) Applicant: ESSILOR INTERNATIONAL, Charenton-le-Pont (FR)

(72) Inventor: Vincent Godot, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/224,845

(22) Filed: Dec. 19, 2018

(65) Prior Publication Data

US 2019/0118328 A1    Apr. 25, 2019

Related U.S. Application Data

(63) Continuation of application No. 14/896,213, filed as application No. PCT/EP2014/063359 on Jun. 25, 2014.

(30) Foreign Application Priority Data

Jul. 1, 2013    (EP) .................................... 13305931

(51) Int. Cl.
  *B24B 13/005*    (2006.01)
  *G05B 19/402*    (2006.01)
  *B29D 11/00*    (2006.01)

(52) U.S. Cl.
  CPC .... *B24B 13/0055* (2013.01); *B29D 11/00942* (2013.01); *G05B 19/402* (2013.01);
(Continued)

(58) Field of Classification Search
  CPC ........................ B24B 13/0055; G05B 19/402
(Continued)

(56) References Cited

U.S. PATENT DOCUMENTS

| | | | | |
|---|---|---|---|---|
| 2007/0232194 A1* | 10/2007 | Matsuyama | ......... | A61B 5/0408 451/5 |
| 2008/0051012 A1* | 2/2008 | Akiyama | ................ | B24B 9/146 451/42 |
| 2011/0257930 A1* | 10/2011 | Gourraud | .............. | B24B 13/005 702/150 |

FOREIGN PATENT DOCUMENTS

| | | |
|---|---|---|
| EP | 1 762 337 A1 | 3/2007 |
| WO | 2013/087504 A1 | 6/2013 |
| WO | 2013/087505 A1 | 6/2013 |

OTHER PUBLICATIONS

International Search Report, dated Sep. 2, 2014, from corresponding PCT Application.

* cited by examiner

*Primary Examiner* — Matthew E. Gordon
(74) *Attorney, Agent, or Firm* — Young & Thompson (57) ABSTRACT

A method and apparatus for blocking an unfinished optical lens member on a blocker for manufacturing an optical lens from the unfinished optical lens member, the latter being provided with a finished surface having a first reference frame, the blocker having a second reference frame, includes: placing the unfinished optical lens member on the blocker; measuring the relative positioning of the first reference frame of the finished surface of the placed unfinished lens member with respect to the positioning of the second reference frame of the blocker; comparing the measured relative positioning with a predetermined relative positioning to determine a relative positioning shift; moving at least the blocker and/or the lens member to change the relative (Continued)

positioning of the first reference frame with respect to the second reference frame to compensate for the relative positioning shift; and blocking the unfinished lens member on the blocker at the changed relative positioning.

14 Claims, 8 Drawing Sheets

(52) U.S. Cl.
CPC ............... *B29D 11/00961* (2013.01); *G05B 2219/45157* (2013.01)

(58) Field of Classification Search
USPC .......................................................... 700/186
See application file for complete search history.

METHOD OF AND AN APPARATUS FOR MANUFACTURING AN OPTICAL LENS INCLUDING COMPENSATING FOR RELATIVE POSITIONING SHIFT BETWEEN FIRST AND SECOND REFERENCE FRAMES

FIELD OF THE INVENTION

The present invention relates to a method of manufacturing an optical lens. Particularly, but not exclusively, the invention relates to a method of blocking an optical lens at a given positioning for manufacturing of the lens. The invention further relates to an apparatus for manufacturing an optical lens.

BACKGROUND OF THE INVENTION

An optical lens is typically made of plastic or glass material and generally has two opposing surfaces which co-operate with one another to converge or diverge light according to a required corrective prescription. When the positioning or shape of one of these surfaces with respect to the other is inaccurate, optical errors can be created.

Manufacturing of an optical lens to the required prescription requirements typically includes machining the surface of an unfinished lens member such as a semi-finished lens or a lens blank. Typically, a semi-finished lens has a finished surface, for example the front surface and an unfinished opposing surface, for example the back surface. By machining the unfinished surface of the lens to remove material, the required shape and positioning of a back surface with respect to a front surface for the desired corrective prescription can be generated.

During manufacturing of the lens, the semi-finished lens is securely maintained by blocking the semi-finished lens on a blocker. Various techniques may be used to secure the semi-finished lens on the blocker. These include using low temperature fusible alloys, or glue or applying vacuum techniques to hold the semi-finished lens in place.

It is important to secure the semi-finished lens at an accurate positioning on the blocker during the various manufacturing operations in order to prevent the generation of optical errors. With the development of optical lens of increasing superior quality, the necessity for accurate positioning is becoming increasingly important for the correct orientation of the back surface with respect to the front surface. Errors in positioning may include operator error, machine inaccuracy, Current techniques for ensuring that the positioning of a lens member with respect to a blocker is as accurate as possible during manufacturing of an optical lens includes verifying the positioning of the semi-finished lens during the blocking step by methods including an operator visualising the lens positioning directly or by observing the positioning of the semi-finished lens by means of a camera, and then correcting the positioning if necessary. The semi-finished lens is placed on the blocker and the target markings of a positioning camera are used to position the semi-finished lens. For this purpose a semi-finished lens is often provided with marking features including surface markings such as engraved marks, or internal markings to define a reference framework of the design of the finished surface of the lens. Factors such as mechanical shock can however influence the accuracy of the camera visualisation.

The present invention has been devised to address one or more of the foregoing concerns.

SUMMARY OF THE INVENTION

In accordance with a first aspect of the invention there is provided a method of blocking an optical lens member on a blocking device for manufacture of an optical lens from the unfinished optical lens member. The unfinished optical lens member is provided with a finished surface having a first reference frame and the blocker has a second reference frame. The method includes placing the unfinished optical lens member on the blocker; measuring the relative positioning of the first reference frame of the finished surface of the placed unfinished optical lens member with respect to the positioning of the second reference frame of the blocker; comparing the measured relative positioning with a predetermined relative positioning in order to determine a relative positioning shift; moving at least one of the blocker and the lens member so as to change the relative positioning of the first reference frame with respect to the second reference frame to compensate for the relative positioning shift; and blocking the unfinished optical lens member on the blocker at the changed relative positioning By virtue of these features, more accurate positioning of the lens member is provided leading to more accurate machining of the unfinished surface of the lens member with respect to the finished surface. As a result less optical errors are produced in the manufactured optical lens.

In an embodiment, the blocker is provided with a movable part operable to move the second reference frame and changing the relative positioning of the first reference frame with respect to the second reference frame comprises moving the movable part to move the second reference frame.

In an embodiment, the finished surface of the optical lens member is provided with one or more first detectable identification features associated with the first reference frame and the blocker is provided with one or more second detectable identification features associated with the second reference frame; and the step of determining the relative positioning comprises detecting the positions of the first one or more detectable identification features and the second one or more detectable identification features In an embodiment, one of the reference frames is moved with respect to the other reference frame according to at least one of the following positioning parameters: decentration Tx of the centration point of the reference frame, decentration Ty of the centration point of the reference frame; orientation Rz of the reference frame about the vertical z axis of the lens member, orientation Rx about the horizontal x axis of the lens member and orientation Ry about the horizontal y axis of the lens member.

In an embodiment, one of the reference frames is moved with respect to the other reference frame along a vertical translation so that the relative positioning parameter $\Delta Tz$ between the two reference frames corresponds to a predetermined relative positioning parameter $\Delta Tz_{predet}$.

In an embodiment, measuring the relative positioning comprises measuring the positioning parameters Tx, Ty and Rz by means of a first camera positioned according to a camera reference frame.

In an embodiment, measuring the relative positioning comprises measuring the positioning parameters Rx, Ry and/or $T_z$ through at least one second camera positioned with respect to the said camera reference frame.

In an embodiment, positioning the first and/or second camera with respect to camera reference features provided on the blocker.

In an embodiment a machining tool positioning step is provided wherein the speed of approach of the machining tool towards the unfinished surface is determined based on the relative positioning parameter Tz of the two reference frames.

In an embodiment, the predetermined relative positioning is determined based on prescription data including at least one of addition, prism and lens thickness data.

According to a further aspect of the invention there is provided an apparatus for blocking an unfinished optical lens member for manufacture of an optical lens from the unfinished optical lens member, the unfinished optical lens member being provided with a finished surface having a first reference frame; the apparatus comprising:
- a blocker having a second reference frame, on which, in use, the unfinished optical lens member is placed;
- a measuring device for measuring the relative positioning of the first reference frame of the finished surface of the placed unfinished optical lens member with respect to the positioning of the second reference frame of the blocker;
- a calculation module for comparing the measured relative positioning with a predetermined relative positioning in order to determine a relative positioning shift; and
- a positioning device for moving at least one of the blocker and the lens member so as to change the relative positioning of the first reference frame with respect to the second reference frame to compensate for the relative positioning shift; wherein the blocker is operable to block the unfinished optical lens member at the changed relative positioning.

In an embodiment, the blocker comprises a movable part movable by the positioning device to change the relative positioning.

In an embodiment, the movable part is movable according to at least one of the positioning parameters Tx, Ty, Rz, Rx and Ry.

In an embodiment, the blocker comprises a movable part movable along at least the direction Tz so that Tz matches a predetermined $Tz_{predet}$ Since parts of the present invention can be implemented in software, parts of the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal. In the context of the present invention the term "lens member" can refer to a lens blank, an uncut lens, a semi-finished lens or a finished optical lens. It will be understood that the method can thus be applied to any stage of the manufacturing process of an ophthalmic lens.

The blocking method according to the embodiments of the invention can be used to block an optical lens member at a given positioning for manufacturing processes. The optical lens member may be, for example, but not limited to an unfinished or semi-finished optical lens. The optical lens to be manufactured may be an ophthalmic lens or any optical lens component, for example, for use in a camera or telescope.

It will be appreciated that the blocking method may be used at different stages of the manufacturing process of an optical lens. The manufacturing process may be a machining operation, which may be, for example, but not limited to a surfacing operation, a roughing operation, a fining operation, a coating operation, an edging operation, a cribbing operation, a grinding operation or a polishing operation.

The invention further relates to a computer program product for a data processing device, the computer program product comprising a set of instructions which, when loaded into the data processing device, causes the data processing device to perform the method according to the invention. The invention also relates to a computer-readable medium having computer-executable instructions to enable a computer system to perform the method according to the invention.

Unless specifically stated otherwise, as apparent from the present disclosure, it is appreciated that throughout the specification terms such as "computing", "calculating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be especially constructed for the desired purposes, or it may comprise a general purpose computer or Digital Signal Processor ("DSP") selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description which follows. In addition, embodiments of the present invention are not described with reference to any particular programming language. It will be appreciated that a variety of programming languages may be used to implement embodiments of the invention as described herein.

BRIEF DESCRIPTION OF THE DRAWINGS

Embodiments of the invention will now be described, by way of example only, and with reference to the following drawings in which.

DETAILED DESCRIPTION

A first embodiment of a method and apparatus of manufacturing an optical lens from a semi finished lens member will be described with reference to FIGS. 1 A to 8.

Figure 1A:
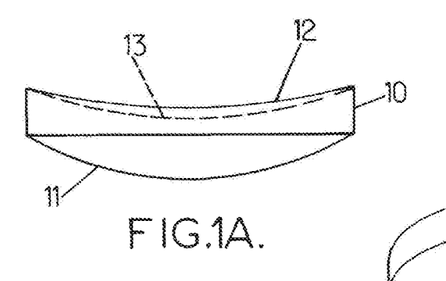
FIG. 1A is a perspective view of an optical lens member to be manufactured according to embodiments of the invention.

With reference to FIG. 1A a semi finished lens member 10 has a first surface 11 machined in accordance with a first design and a second opposing surface 12. The first surface in this example is a preformed front surface 11 which in use of the resulting finished optical lens, is disposed nearest the object being viewed. The opposing surface 12 is an unfinished surface to be modified by the manufacturing process in order to provide the back surface 13 of the finished optical lens, represented by the dashed line. In order to provide the finished surface, the opposing surface 12 is machined by a machining tool so that the back surface 13 is orientated with respect to and distanced from the front surface 12, according to the required optical prescription.

While in this embodiment of the invention, the finished surface is the front surface of the semi-finished lens member and the unfinished surface is the back surface, it will be appreciated, that in alternative embodiments of the invention the finished surface may be the back surface of the semi-finished lens member and the unfinished surface to be modified may be the front surface. Moreover, although the optical surface 13 to be manufactured is represented in FIG. 1A as concave, it will be appreciated that the optical surface 13 could equally well be convex or any other curved surface Accurate positioning of the semi-finished lens member 10 on a blocking device is required in order that the required optical prescription is respected with accuracy.

Figure 1B:
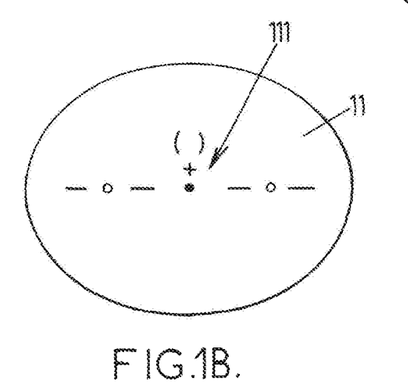
FIG. 1B is a planar view of a preformed surface of a semi finished lens member to be machined according to embodiments of the invention.

With reference to FIG. 1B, engraved markings 111 are provided on the preformed front surface 11 of the semi finished lens member 10 to act as reference features for defining a reference frame of the front surface of the semi-finished lens member 10 for positioning purposes of the lens member on a blocking device.

Referring now to FIGS. 2A and 2B and FIGS. 3A and 3B, a lens blocking device 200 for blocking lens member 10 in the correct positioning for manufacturing processes comprises a blocker 21, a blocking ring 22 on which the semi-finished lens member 10 is placed, a blocking reference plate 27 on which the blocking ring 22 is positioned, and a clamping arm 35, which may be moved from a free position to a clamping position in which it holds the semi-finished lens member 10 in place on the blocking device 200

Figure 2A:
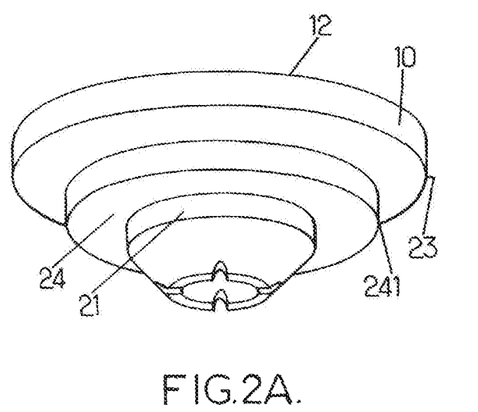
FIG. 2A is a cross-sectional view of a lens member and blocking device according to a first embodiment of the invention.
Figure 2B:
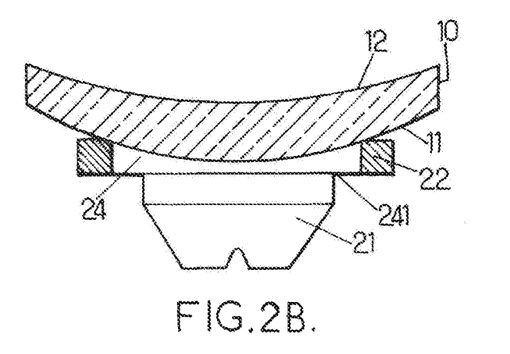
FIG. 2B is a perspective view of a lens member and blocking device according to the first embodiment of the invention.
Figure 3A:
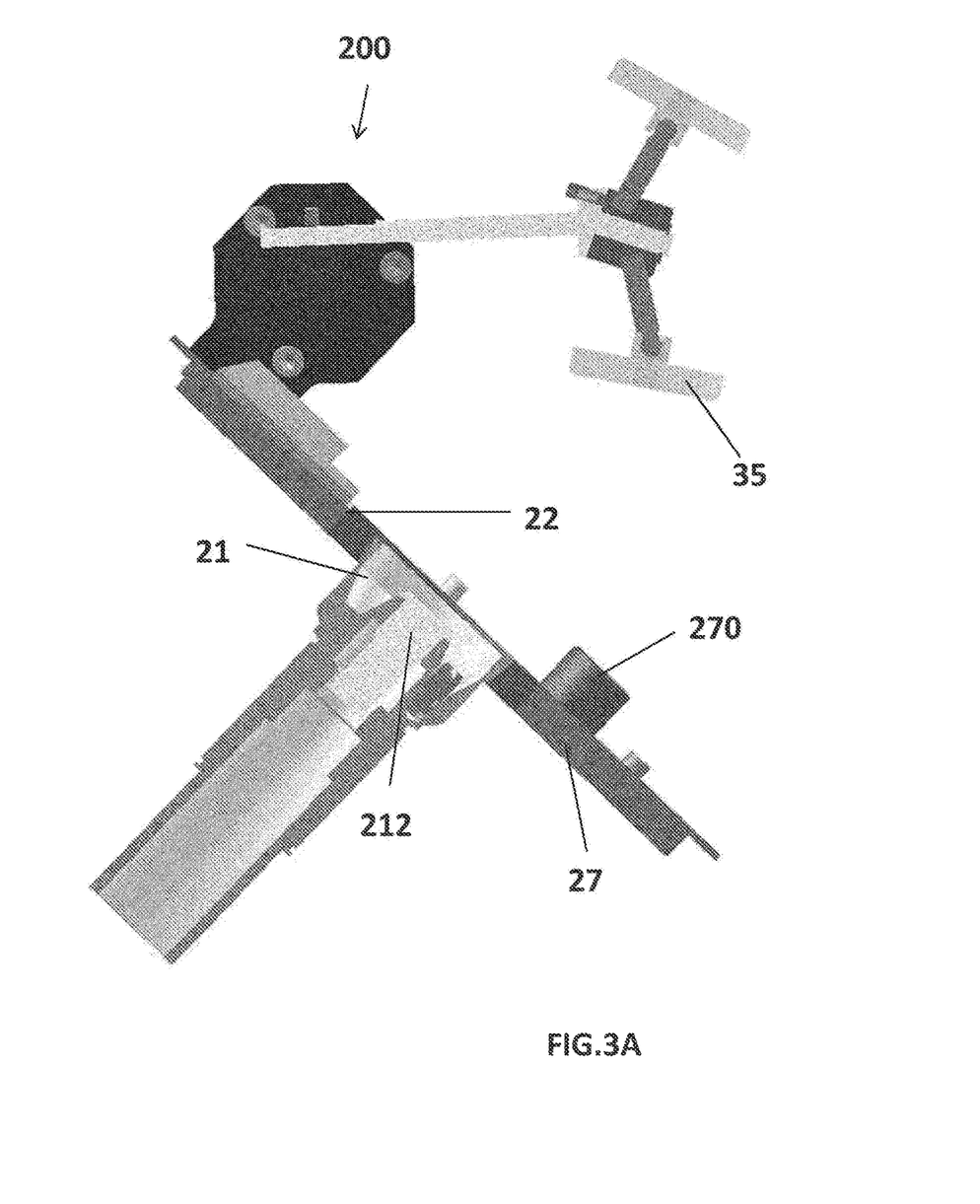
FIG. 3A is a cross sectional view of a blocking device in accordance with an embodiment of the invention.

The blocker 21 has a mobile part 212 provided with a cavity. The cavity is configured to hold blocking means and in some embodiments an insert or blocking grip. The blocking means may for example be a vacuum provided in the cavity for blocking the lens member 10 in place by vacuum techniques, once the required positioning between the blocker 21 and the finished surface 11 of the unfinished lens member 10. In another embodiment the cavity of the mobile part 212 may be configured to hold blocking cast material such as fusible metal or thermoplastic which solidifies when cooled to hold the lens member 10 in place. The mobile part 212 of the blocker has a movable reference frame which moves with respect to the reference frame of the semi-finished lens 10 when the mobile part 212 is moved.

Figure 4:
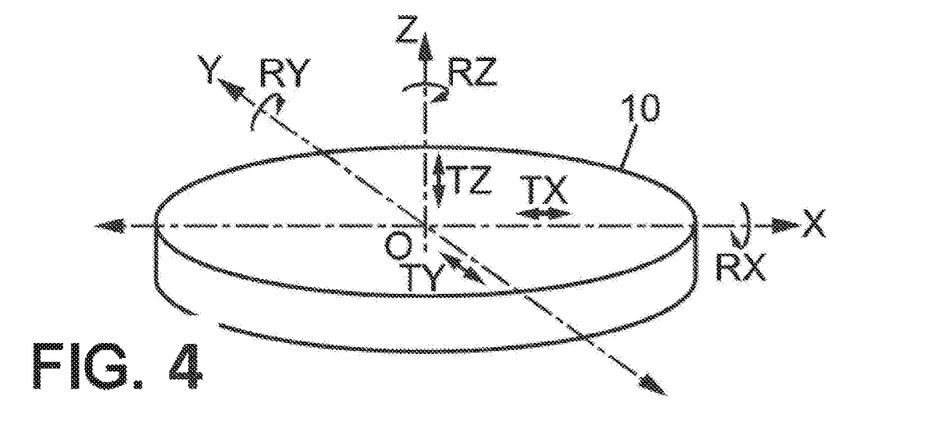
FIG. 4 is a perspective view of an unfinished lens member illustrating the degrees of movement according to positioning parameters in accordance with an embodiment of the invention.

The mobile part 212 of the blocker is configured to move according to six degrees of freedom in order to adjust positioning parameters of the front surface 11 of the semi-finished lens with respect to the blocking device 200: with reference to FIG. 4 the positioning parameters include:

translation TX and TY in a horizontal plane XY with decentration TX, TY, defining the displacement of the centration point O of the lens in the X and Y direction, respectively in the horizontal plane;

translation TZ along a vertical axis, orientation RZ of the lens member about the vertical Z axis, sometimes referred to as orientation of the nasal-temporal axis of the lens member;

orientation RY of the lens member about the horizontal Y axis, orientation RX of the lens member about the horizontal X axis, The mobile part 212 of the blocker is movable according to the positioning parameters Tx, Ty, Tz, Rz, Rx and Ry by means of 6 independently piloted motors.

Positioning of the lens member for manufacture according to prescriptive requirements will depend on factors such as the prism of the semi-finished lens member 10 on the blocking ring 22, the decentration of semi-finished lens member 10 on the blocking ring 22, the orientation of the cavity of the mobile part with respect to the reference plate 27, and in some embodiments, on the thickness of the semi-finished lens member 10.

In order to obtain the desired relative positioning of the reference frame of the front surface 11 of the semi-finished lens 10 with respect to the reference frame of the blocking device 20 the following data is provided.

Prescription data of the optical lens to be manufactured includes data defining the addition, surface data defining the surface including SPH, CYL and the vertical axis VL, data defining the prescription prism etc. Other data associated with the optical lens such as mounting data defining the mount of the optical lens in spectacle frames may also be supplied.

Geometrical data defining the semi-finished lens member includes the thickness, the base of the lens, the addition of the lens, surface data including the radius of curvature etc.

Blocking parameters include the prism of the finished lens (balancing prism and/or prescription prism), positioning prism on the blocking ring, insert prism and the positioning parameters mentioned above.

Figure 3B:
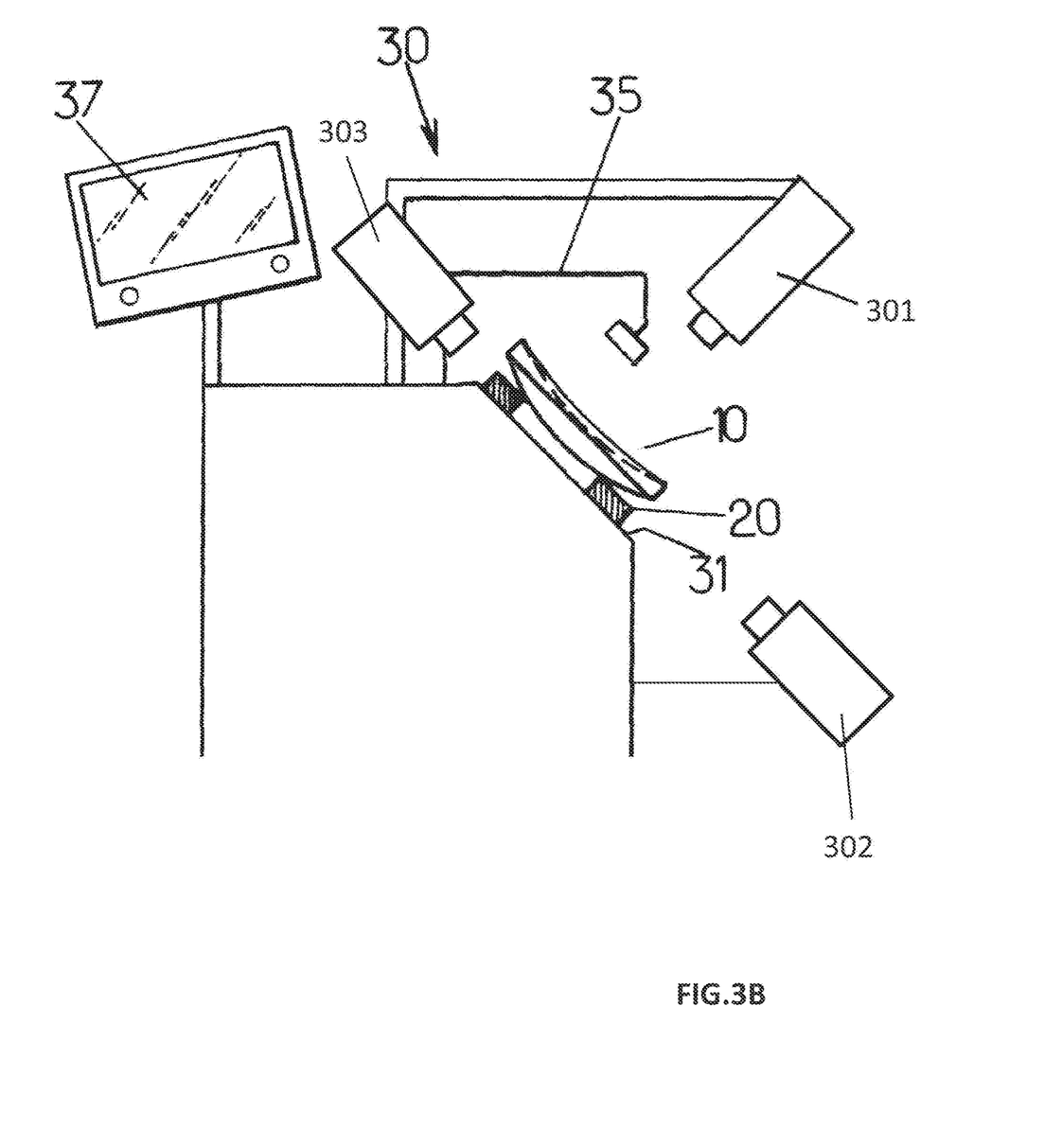
FIG. 3B is a schematic view of a blocking station in accordance with an embodiment of the invention.

Lens blocking device 200 is part of a blocking station 30 as illustrated in FIG. 3B. The blocking station 30 comprises the blocking device 20 disposed on a top plate 31 of the blocking station 30 and the clamping arm 35 which may be moved from a free position to a clamping position in which it holds the lens member 10 in place on the blocking device 20.

Figure 5:
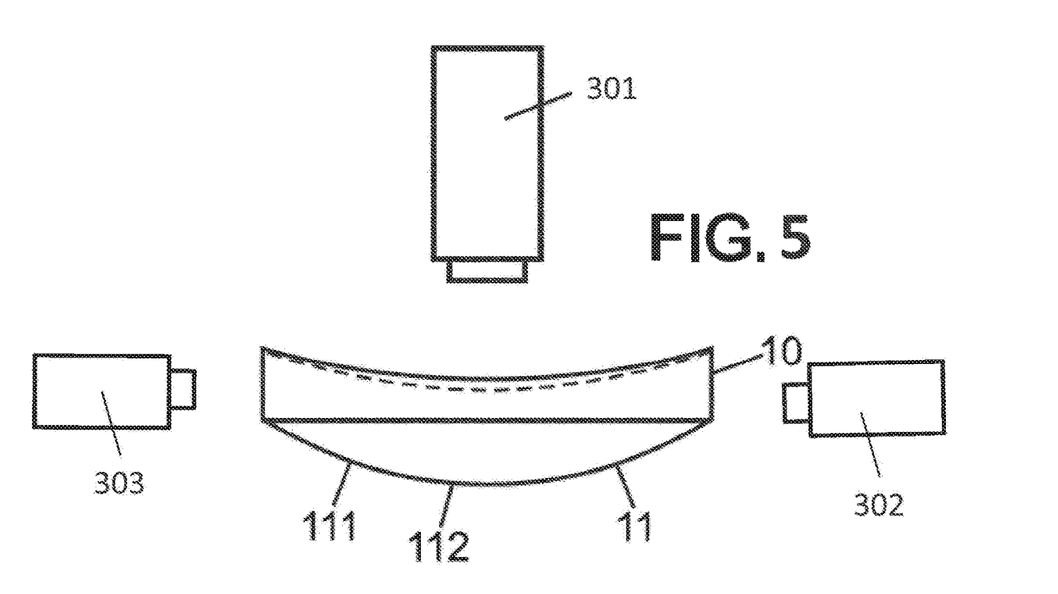
FIG. 5 is a schematic view of the positioning of viewing cameras with respect to the unfinished lens member in accordance with an embodiment of the invention.

With reference to FIG. 3B and FIG. 5, three cameras 301, 302 and 303 are provided for taking images of the positioning of the semi-finished lens member 10 on the blocker 21. At least one screen 37 is provided for viewing the image from the cameras.

The first camera 301 is positioned along a vertical axis above the semi-finished lens member 10 and detects the engravings 111 on the front surface 11 of the semi-finished lens member 10 in order to measure the relative positioning of the reference frame of the front surface 11 of the semi-finished lens member 10. By vertical axis is meant an axis passing though the thickness of the semi-finished lens member 10 The first camera 301 is configured to measure the positioning parameters Tx, Ty and Rz for compensation in the respective direction of movement by the corresponding motors of the mobile part 212 of the blocker 21.

The second camera 302 and the third camera 303 are each positioned along an x or y axis of a horizontal plane, perpendicular to the vertical axis. The two cameras 302 and 303 may be positioned along the horizontal x,y plane on opposite sides of the semi-finished lens member as illustrated in FIG. 4, or at 90° to one another. Images from the second and third camera 302 and 303 are used to measure geometrical features of the semi-finished lens member 10 including the prism and the altitude at its positioning. This enables the relative positioning between the reference frame of the finished surface 11 of the semi-finished lens 10 and the reference frame of the blocker 21 in terms of positioning parameters Rx, Ry and Tz to be measured. Correction of the measured prism and altitude or predetermined prism and altitude values may be made by movement of the motors of the mobile part 212 of the blocker 21 controlling positioning parameters Rx, Ry and Tz.

Blocking reference plate 27 is provided with at least two physical reference features 270, which can be used for aligning the cameras, and for comparing the relative positioning of the lens member and the blocker.

Figures 6A, 6B:
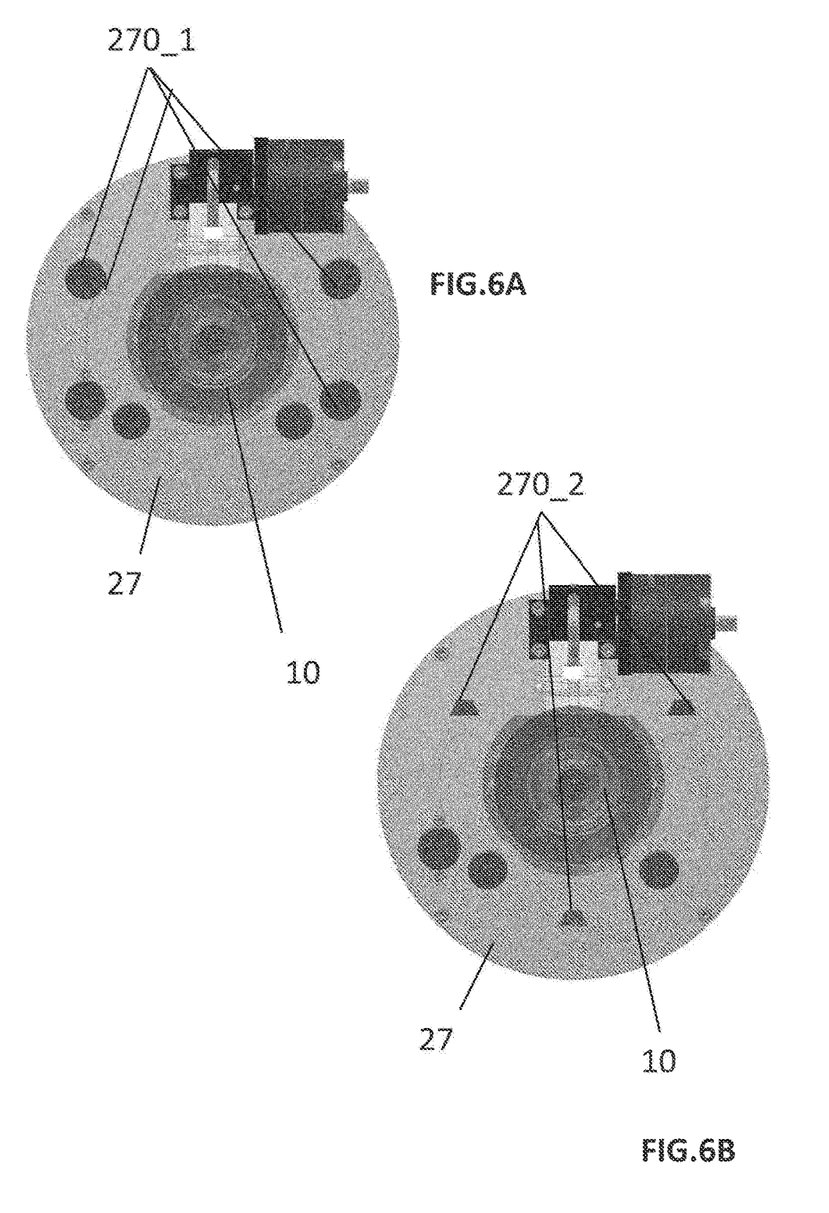
FIG. 6A is a planar view of the blocking device illustrating reference features on the blocking plate in accordance with an embodiment of the invention.
FIG. 6B is a planar view of the blocking device illustrating reference features on the blocking plate in accordance with another embodiment of the invention.
Figure 7A:
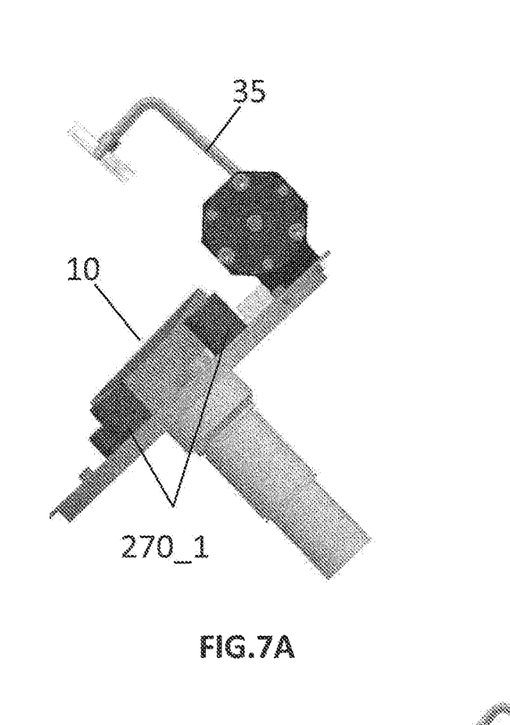
FIG. 7A is a perspective view of the blocking device illustrating reference features on the blocking plate in accordance with an embodiment of the invention.
Figure 7B:
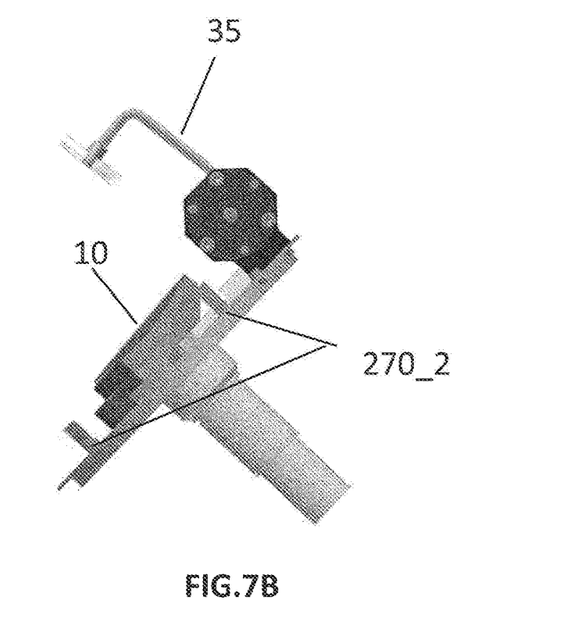
FIG. 7B is a perspective view of the blocking device illustrating reference features on the blocking plate in accordance with another embodiment of the invention.

A calibration process is performed to determine correct positioning of the cameras 301, 302, 303 using the reference features 270 provided on the reference blocking plate 27. Two objects having different shapes may be used as the reference features for example so that the direction of the camera may be determined. In other embodiments the reference features may have the same shape. The shapes of the reference feature objects may be selected from symmetrical shapes including a sphere, a cylinder, a cube or a flat topped pyramid type shape, for example. Such shapes enable the barycentre of the reference feature object to be identified in the image. Examples are shown in FIGS. 6A, 6B, 7A and 7B. In FIG. 6A four cylindrical shaped objects 270_1 are positioned on the reference plate 27 for alignment of the vertical camera 301, and in FIG. 6B three flat shaped pyramidal shaped objects 270_2 are placed on the reference plate 27 for aligning the vertical camera 301.

In other embodiments of the invention the vertical camera 301 may be aligned using blocking reference features provided directly on the blocker 20

The calibration process also includes alignment of the horizontally placed cameras 302 and 303 for positioning parameters Rx/Ry/Tz with respect to the blocker 21. At least two geometrical objects are placed on the reference plate 27 for calibration of the positioning of cameras 302 and 303.

For calibration of the positioning of the three cameras 301, 302 and 303 reference objects 270 are placed spaced apart on the reference plate. In one embodiment two reference objects visible by the three cameras 301, 302 and 303 are used.

In one specific embodiment the reference objects 270 are placed such that vertical camera 301 can visualise at least two of the reference objects 270 in order to calibrate positioning parameters Tx, Ty and Rz. For horizontal cameras 302 and 303 in the case where three reference objects are placed on the reference plate at least one reference object must be commonly visible by two cameras 302 and 303. The three reference objects may be placed apart by 120° for example. For horizontal cameras 302 and 303 in the case where two reference objects are placed on the reference plate, the two reference objects must be visible to both cameras 302 and 303

Horizontal cameras 302 and 303 can be used to calculate the position of the reference frame of the blocker 21 with respect to the camera's own reference frame. The improved calibration enables more consistent blocking to be obtained.

Figure 8:
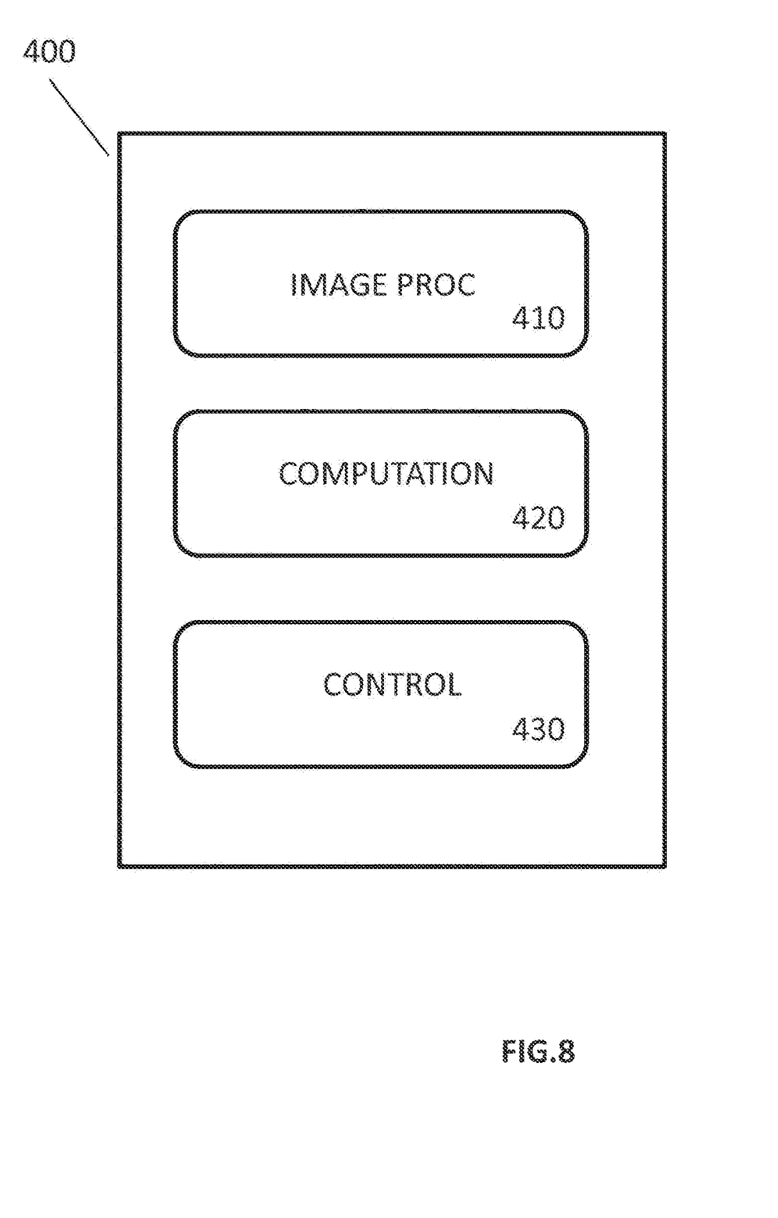
FIG. 8 is a block diagram of a processing device in accordance with an embodiment of the invention.

With reference to FIG. 8, an image processing device 400 comprises an image processing module 410 for processing the images captured by cameras 301, 302 and 303 in order to determine the positioning of the reference frame of the front surface 11 of the semi-finished lens 10 with respect to the reference features 270 of the reference plate 27 by detection of the engraved reference features and measurement of the geometrical features by the three cameras 301, 302 and 303 as explained above. A calculation module 420 is provided for comparing the determined relative positioning between the reference frame of the front surface 11 of the semi-finished lens 10 and the reference frame of the blocker 21 with a predetermined relative positioning to obtain a relative positioning shift according to one or more of the six directions of movement Tx, Ty, Ty, Rx, Ry, Rz, and a control module 430 for controlling the motors of the mobile part 212 to move the mobile cavity according to at least one of the positioning parameters Tx, Ty, Ty, Rx, Ry, Rz to compensate for the relative positioning shift.

When a desired relative positioning between the reference frame of the mobile part 212 of the blocker 21 and the reference frame of the finished surface 11 of the semi-finished lens 10 is obtained the semi-finished lens member 10 is blocked at that positioning on the blocker 20. In one embodiment to block the lens member 10 a vacuum technique is applied, a vacuum being formed in the cavity of the mobile part 212, the vacuum cavity being delimited by part of the front surface 11 of the semi-finished lens member 10. In another embodiment blocking cast material is poured into the cavity of the mobile part 212. The blocking cast material cools to solidify in order to block the optical lens 10 at the desired positioning for machining—i.e. at the predetermined relative positioning between the reference frames. Machining techniques may then be applied to the back surface 12 in order to provide a back surface 13 of the optical lens in accordance with prescriptive requirements. Some machining techniques employed may include a machining tool positioning step wherein the speed of approach of the machining tool towards the unfinished back surface 12 is determined based on the prism determined from the positioning parameter Tz measured by the cameras. This helps to speed up the manufacturing process since the vertical position of the back surface can be accurately predicted. Moreover piloting of the vertical axis helps to optimise the thickness of the blocking material such as fusible metal required and the number of inserts used.

By compensating in such a manner for errors in positioning, the optical quality of machined optical lens can be improved. This is particularly important in the manufacture of high quality lens product and as manufacturing techniques become more and more complex.

Many further modifications and variations will suggest themselves to those versed in the art upon making reference to the foregoing illustrative embodiments, which are given by way of example only and which are not intended to limit the scope of the invention, that being determined solely by the appended claims. In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method of blocking an unfinished optical lens member on a blocker for manufacture of an optical lens from the unfinished optical lens member, the unfinished optical lens member being provided with a finished surface, the method comprising:
   placing the unfinished optical lens member on the blocker;
   measuring the relative positioning of the finished surface of the placed unfinished optical lens member with respect to the positioning of a movable part of the blocker using reference features provided on the finished surface of the lens member and reference features provided on the movable part of the blocker;
   comparing the measured relative positioning with a predetermined relative positioning in order to determine a relative positioning shift;
   moving the movable part of the blocker to change the relative positioning of the movable part of the blocker with respect to the unfinished optical lens member to compensate for the relative positioning shift; and
   blocking the unfinished optical lens member on the blocker at the changed relative positioning using the movable part of the blocker.

2. The method according to claim 1, wherein:
   the finished surface of the optical lens member is provided with one or more first detectable identification features and the blocker is provided with one or more second detectable identification features, and
   the determining the relative positioning comprises detecting the positions of the first one or more detectable identification features and the second one or more detectable identification features.

3. The method according to claim 1, wherein the movable part of the blocker is moved according to at least one of the following positioning parameters:
   decentration Tx of the centration point of the detectable identification features provided on the finished surface of the lens member or of the centration point of the one or more second detectable identification features provided on the blocker,
   decentration Ty of the centration point of the detectable identification features provided on the finished surface of the lens member or of the centration point of the one or more second detectable identification features provided on the blocker,
   orientation Rz about the vertical z axis of the unfinished optical lens member, and
   orientation Rx about the horizontal x axis of the unfinished optical lens member and orientation Ry about the horizontal y axis of the unfinished optical lens member.

4. The method according to claim 3, wherein the movable part of blocker is moved with respect to the unfinished optical lens member along a vertical translation so that the positioning parameter between the movable part of the blocker and the unfinished optical lens member corresponds to a predetermined relative positioning parameter $\Delta Tz_{predet}$.

5. The method according to claim 4, wherein measuring the relative positioning comprises measuring the positioning parameters Tx, Ty and Rz by a first camera positioned according to a camera reference frame.

6. The method according to claim 5, wherein measuring the relative positioning comprises measuring the positioning parameters Rx, Ry and/or $T_z$ through at least one second camera positioned with respect to the camera reference frame.

7. The method according to claim 6, further comprising positioning the first camera and/or the second camera with respect to camera reference features provided on the blocker.

8. The method according to claim 4, further comprising positioning a machining tool, the speed of approach of the machining tool towards the unfinished surface being determined based on the relative positioning parameter Tz.

9. The method according to claim 1, wherein the predetermined relative positioning is determined based on prescription data including at least one of addition, prism and lens thickness data.

10. A computer program product for a programmable apparatus, the computer program product comprising a sequence of instructions for implementing the method according to claim 1 when loaded into and executed by the programmable apparatus.

11. The method according to claim 3, wherein measuring the relative positioning comprises measuring the positioning parameters Tx, Ty and Rz by a first camera positioned according to a camera reference frame.

12. An apparatus for blocking an unfinished optical lens member for manufacture of an optical lens from the unfinished optical lens member, the unfinished optical lens member being provided with a finished surface, the apparatus comprising:
   a blocker, on which, in use, the unfinished optical lens member is placed;
   a measuring device configured to measure the relative positioning of the finished surface of the placed unfinished optical lens member with respect to the positioning of a movable part of the blocker using reference features provided on the finished surface of the lens member and reference features provided on the movable part of the blocker;
   a calculation module configured to compare the measured relative positioning with a predetermined relative positioning in order to determine a relative positioning shift; and
   a positioning device configured to move the movable part of the blocker to change the relative positioning of the movable part of the blocker with respect to the unfinished optical lens member to compensate for the relative positioning shift, wherein the blocker is operable to block the unfinished optical lens member at the changed relative positioning using the movable part of the blocker.

13. The apparatus according to claim 12, wherein the movable part is movable according to at least one of the positioning parameters:
- decentration Tx of the centration point of the one of the reference frames,
- decentration Ty of the centration point of detectable identification features provided on the finished surface of the lens member or of the centration point of one or more second detectable identification features provided on the blocker,
- orientation Rz about the vertical z axis of the unfinished optical lens member, and
- orientation Rx about the horizontal x axis of the unfinished optical lens member and orientation Ry about the horizontal y axis of the unfinished optical lens member.

14. The apparatus according to claim 12, wherein the movable part is movable along at least a z direction Tz so that the direction Tz matches a predetermined $Tz_{predet}$.

* * * * *